United States Patent Office 2,801,199
Patented July 30, 1957

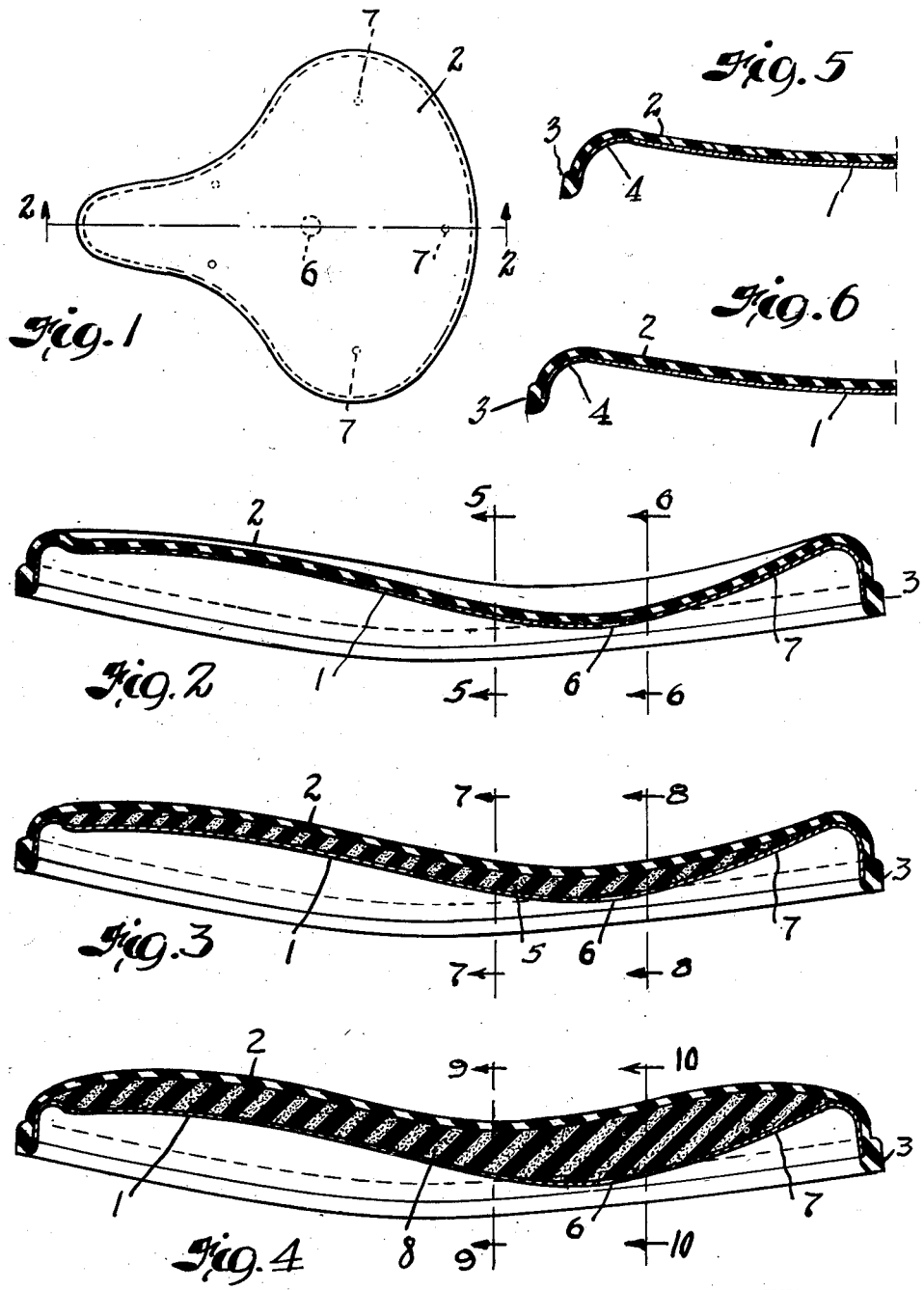

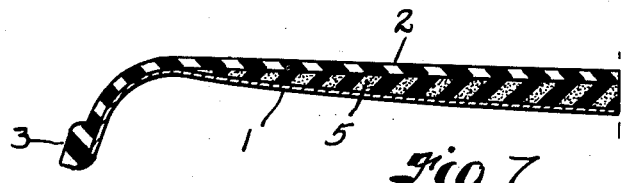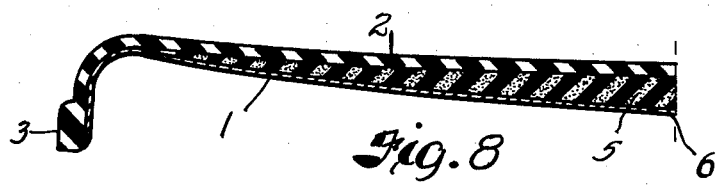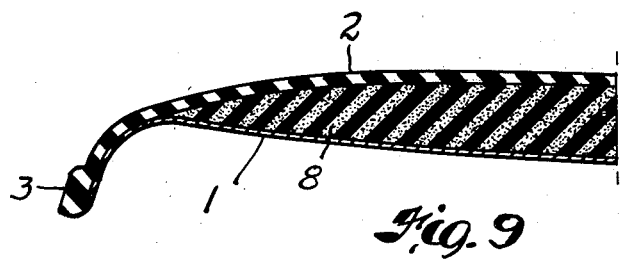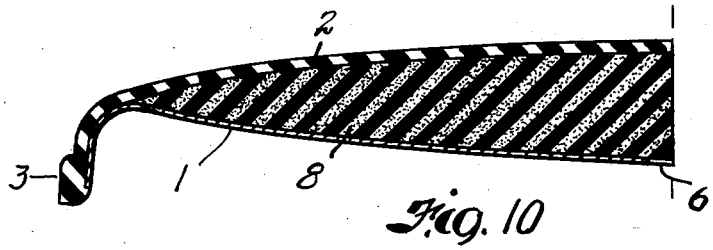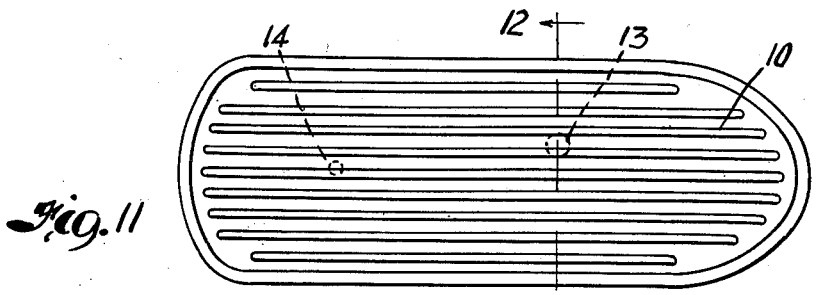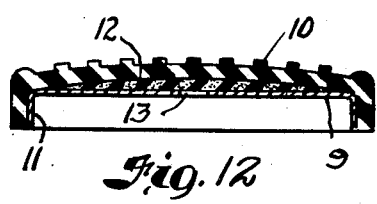

2,801,199

METHOD OF MAKING A RESILIENT FOAM-FILLED ARTICLE

George L. Meyers, Willoughby, Ohio, assignor to The Eagle-Picher Company, Cincinnati, Ohio, a corporation of Ohio Application July 10, 1953, Serial No. 367,230

5 Claims. (Cl. 154—110)

This invention relates as indicated to resilient foam filled articles, and more particularly to cushioned articles wherein a cavity is filled with resilient foamed material adapted to yield under pressure.

The employment of foam rubber and like resilient sponge materials has greatly increased in recent years not only in the manufacture of such articles as seat cushions and mattresses, but also in the manufacture of composite metal and rubber articles where a layer of the resilient sponge material may be interposed between a supporting metal element and an outer sheet rubber surface, for example. This has usually involved trimming the foam rubber to desired shape and size, with considerable scrap being produced and then mounting the same on the metal support and fixing the outer covering thereover. Such operations involve considerable hand work and are therefore costly as well as resulting in a rather non-uniform product. It is usually particularly desired that the outer sheet material be tightly stretched and properly contoured to afford a pleasing appearance and proper operating characteristics.

It is accordingly a principal object of my invention to provide a method of making resilient foam filled articles in which the internal cavity is substantially completely filled with such resilient foam material and the flexible sheet material covering distended to desired contour.

Another object is to provide such method which will produce uniform articles of the type indicated quickly and inexpensively.

Other objects will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a top plan view of a bicycle seat illustrating the type of product adapted to be produced in accordance with my invention;

Fig. 2 is a longitudinal sectional view through such seat on the line 2—2 of Fig. 1 prior to injection of the foam forming material intermediate the sheet metal supporting member and the outer flexible surface material;

Fig. 3 is a view similar to Fig. 2 but showing such foam forming material injected;

Fig. 4 is a view similar to Fig. 3 but showing such foam forming material expanded to final proportions;

Fig. 5 is a transverse section taken on the line 5—5 on Fig. 2;

Fig. 6 is a transverse section taken on the line 6—6 on Fig. 2;

Fig. 7 is a transverse section taken on the line 7—7 on Fig. 3;

Fig. 8 is a transverse section taken on the line 8—8 on Fig. 3;

Fig. 9 is a transverse section taken on the line 9—9 on Fig. 4;

Fig. 10 is a transverse section taken on the line 10—10 on Fig. 4;

Fig. 11 is a top plan view of an automobile accelerator pedal likewise illustrating my invention; and Fig. 12 is a transverse sectional view taken on the line 12—12 on Fig. 11 showing the injected and foamed filler material.

Now referring more particularly to said drawing and Figs. 1, 5 and 6 thereof, a bicycle seat is there illustrated comprising a sheet metal stamping 1 formed to the desired seat conformation and to the upper contoured surface of which has been applied a sheet of uncured rubber stock 2 with a molded flange or edge portion 3 enclosing and bonded to the outer peripheral edge of the sheet metal stamping. Copperized surface adhesion is preferred for thus joining the sheet rubber to the periphery of the stamping in a region extending from the edge of the stamping approximately midway of the angle 4 of the downturned edge portion thereof. The remainder of the upper surface of the metal stamping will be coated with an anti-sticking agent such as film scrap dissolved in acetone, for example, to prevent the rubber from adhering thereto. The composite article is then cured or substantially cured in the usual manner. As shown in Figs. 2, 5 and 6, the rubber sheet material 2 then lies snugly conforming to the contours of the sheet metal support 1 to which it has been applied.

By means of an appropriate injection device such as an Alemite grease gun for example, the resilient foam forming material 5 (in unexpanded condition) is next injected through an opening 6 in the sheet metal stamping 1, thereby forcing the flexible sheet material 2 away from the upper suface of such stamping and filling the interstice therebetween as shown in Fig. 3. Small bleeder holes or vents 7 will ordinarily be provided spaced from the larger and more central opening 6 where the foam forming material is injected to permit the escape of air and ensure substantially complete filling of the space between members 1 and 2. Of course, the contour of the sheet metal support 1 will still control the general contour of the flexible sheet material 2, allowance being made for the fact that the greatest expansion will normally take place in the region furthest spaced from the seat periphery.

The resultant composite article of Fig. 3 is next placed in an oven which may be at a temperature of from about 325–350° F., in the case of the usual vinyl sponging plastisols, and kept there for about 15–20 minutes in order to blow the sponging material. When removed from the oven, the article will have an expanded cross-section as shown in Figs. 4, 9 and 10 of the drawing, the expanded material 8 stretching the outer sheet material 2 to a firm, well-rounded outline but at the same time resiliently supporting and cushioning the same. A small but inconsequential amount of the filler material may tend to extrude at the hole 6 and bleeder holes 7. In some instances, however, it may be desirable to stop such holes prior to blowing the sponging material.

Now referring more particularly to Figs. 11 and 12 of the drawing, an automotive accelerator pedal is there shown comprising a sheet metal stamping 9 having a molded rubber tread portion 10 applied thereto and enveloping and bonded to the downturned peripheral edge portion 11. The composite article is cured or partly cured in the same general manner as the bicycle seat above described, anti-stick having been applied to the upper surface of the stamping 9 opposed to the rubber tread portion. A sponging material such as a chemically sponging plastisol of a vinyl compound 12 is then injected through opening 13 in the stamping 9, a vent or vents such as opening 14 in the stamping assisting in the escape of any entrapped air. The pedal is then subjected to oven heat of 325–350° F. for 15–20 minutes in order to blow the sponging plastisol to the extent permitted by the unbonded rubber covering 10 and thus provide a cushioned pedal pad (Fig. 12).

Of course, many different articles may desirably be formed in a similar manner such as seat toppers, seat backs, furniture upholstery, arm rests, mattresses, crash pads and the like. The separate manufacturing and molding or cutting to shape of the resilient cushioning material and subsequent application and conformation of the same to the article to be cushioned is thus eliminated, and complete filling of the hollow article to the extent desired within the expansible limits of the same is obtained. The expansion of the foaming material itself achieves the expansion of the article.

In producing composite articles of the type described, the sheet material supporting element will ordinarily be sheet metal, and more particularly steel, although of course a wide variety of materials are suitable. Similarly, a variety of flexible sheet materials such as rubber, neoprene, polyvinyl chloride, and polyvinyl chloride-acetate copolymers may be utilized. The composition of a typical example of suitable rubber stock for the bicycle seat cover 2, for example, is as follows:

| | Parts |
|---|---|
| Neoprene GN | 7.38 |
| Black whole tire reclaim (Champion—made by Pequanoc Co.) | 17.72 |
| Black whole tire reclaim (Midco B—made by Midwest Co.) | 35.41 |
| Captax (mercapto benzothiazole) | .29 |
| Sulfur | 1.33 |
| Zinc oxide | 1.14 |
| Flectol H (age resister), a condensation product of acetone and aniline | .38 |
| Stearic acid | .71 |
| MRX (granulated mineral rubber) | 5.19 |
| Pelletex (semi-reinforcing carbon black) | 9.05 |
| Circosol 2XH (oil—Sun Oil Co.) | 5.36 |
| RPA #3 (softener—rubber peptizing agent and Dupont) | .14 |
| Fortex (plasticizer and extruder) | 4.76 |
| Retarder (benzoic acid) | .19 |
| Magnesium oxide | .95 |
| | 100.00 |

A typical formulation of suitable sponge forming material may be given as follows:

| | Parts |
|---|---|
| GRS—1000 (Banbury masticated 15 minutes) | 290.30 |
| Circo light oil | 275.29 |
| Ground blk. scrap (40 mesh) | 272.16 |
| Unicel N. D. (blowing agent 60% inert filler 40% dinitroso-pentamethylene-tetramine) | 8.00 |
| Sulfur | 20.00 |
| Zinc oxide | 27.21 |
| D. P. G. (accelerator—diphenylguanidine) | 3.25 |
| El-60 (accelerator—di benzothiazyl—di methyl-thiolurea) | 3.25 |
| Limestone | 226.80 |
| Stearic acid | 11.34 |
| | 1,137.60 |

Sponging plastisols of vinyl compounds are well known to those skilled in the art and widely used, usually comprising a low viscosity, high solid content, paste dispersion of polyvinyl chloride with a plasticizer, commonly dioctylphthalate. A sponging or blowing agent, such as sodium or ammonium bicarbonate, is incorporated in such plastisol to afford a sponging plastisol suitable for employment in accordance with the present invention. A typical vinyl compound suitable for employment is as follows:

| | Parts |
|---|---|
| Polyvinyl chloride | 100 |
| Dioctylphthalate | 50 |
| Octyl diphenyl phosphate | 50 |
| Organic tin stabilizer (e. g. stabilizer 52, Advance Solvents and Chemical Corp.) | 3 |

As indicated above, copperized (flash plated) surface adhesion may be replied upon to bond desired portions of the cover stock to the metal member, and cellulose acetate film scrap dissolved in acetone may be used as an anti-stick agent. These and other materials for like purposes are, of course, well known to the trade. In some cases, talc suspensions or soap solutions may be employed as the anti-stick agent.

Standard Alemite pressure lubricant guns, of a type commonly employed for automotive grease lubrication, are satisfactory for injection of the foam forming material. Other known foam-forming materials may be employed having similar formulations, rubber, neoprene, or vinyl chloride polymers being substituted for the GRS in the above example.

It will be seen from the foregoing that I have provided a new method of producing resiliently compressible foamed plastic fillings for resilient rubber articles and the like, such articles being produced in initially collapsed form and the material which is to produce the foam being injected therein. Upon vulcanizing or otherwise curing or activating, such injected material foams and expands in situ, thereby inflating to some extent at least the article within which it is entrapped. The rigid support such as metal stamping 1 and the flexible sheet material 2 secured thereto define a cavity therebetween into which the foaming material may be injected actively to distend such flexible sheet material. The latter will ordinarily also be resilient and capable of stretching to some extent but flexible materials such as rubberized fabrics and the like are suitable for some uses and may permit considerable expansion of the foaming material especially if initially conforming to a concave contour. Sheet materials adapted to yield somewhat at the temperature to which the article is subjected during the foaming operation may likewise sometimes be utilized.

When forming articles such as the bicycle seat above described it is usually highly desirable to place the same in a form prior to the foaming operation to ensure that the exact desired seat contour is obtained. In the case of other articles such as the accelerator pedal described where the cured rubber stock may be relatively thick and the cavity thereunder small it is seldom necessary to employ a restraining form during the foaming and distending operation.

Other modes of applying the principle of the invention may be employed, change being made as regards the details described, provided the features stated in any of the following claims or the equivalent of such be employed.

I therefore particularly point out and distinctly claim as my invention:

1. The method of making a composite article having a rigid supporting portion and a resiliently deformable cushioned supported portion which comprises forming a sheet metal base member to desired contour, applying anti-stick material to a surface of such sheet metal base member in a region inwardly of the outer peripheral portion thereof, applying and conforming a sheet of uncured rubber stock to such surface of such base member, molding and curing such composite article to bond such rubber sheet material to such peripheral edge portion of such base member, injecting a chemically sponging plastisol through an opening in such base member somewhat to spread apart such rubber sheet material from such base member in the region where such rubber sheet material has not been adhered to such base member and then heating such composite article to blow such sponging plastisol to the extent permitted by further flexing and stretching of such rubber sheet material further to alter the contour of the latter and resiliently to support and cushion the same.

2. The method of making a composite article having a rigid supporting portion and a resiliently deformable cushioned supported portion which comprises forming a sheet metal base member to desired contour having a downturned peripheral lip, copperizing the outer surface of such lip for bonding of rubber stock thereto, applying anti-stick material to the surface of such sheet metal base member in a region inwardly of such outer peripheral lip, providing a generally central inlet opening through such sheet metal base member and smaller vent openings spaced therefrom toward such lip, applying and conforming a sheet of uncured rubber stock to such surface of such base member, molding and curing such composite article to bond such rubber sheet material to such peripheral lip of such base member, injecting a chemically sponging plastisol of a vinyl compound through such central opening in such base member under pressure to spread apart such rubber sheet material from such base member in the region where such rubber sheet material has not been adhered to such base member and then heating such composite article at a temperature of approximately 325–350° F. for approximately 15–20 minutes to blow such sponging plastisol to the extent permitted by further flexing and stretching of such rubber sheet material further to alter the contour of the latter to an expanded cross-section and resiliently to support and cushion the same.

3. The method of making a composite article having a rigid supporting portion and a cushioned supported portion which comprises the sequential steps of forming a rigid base to desired contour, securing resiliently flexible sheet material thereto conforming to an opposed surface of such rigid base to define a collapsed, substantially closed cavity therebetween, injecting resilient foam forming material into such collapsed cavity to expand the same by distending such resiliently flexible sheet material and then treating such composite article to activate such foam forming material to produce resilient foam filling such cavity and further distending such resiliently flexible sheet material to support and cushion the same.

4. The method of making a composite article having a rigid supporting portion and a cushioned supported portion which comprises forming a sheet metal base member to desired contour, applying anti-stick material to a surface of such sheet metal base member in a region inwardly of the outer peripheral portion thereof, applying and generally conforming a sheet of elastomer stock to such surface of such base member, bonding such sheet to the peripheral edge portion of such base member, injecting a sponge-forming elastomer composition between such sheet and such base member, and then blowing such sponge-forming elastomer to distend such sheet and resiliently support the same.

5. The method of making a composite article having a rigid supporting portion and a cushioned supported portion which comprises forming a sheet metal base member to desired contour, applying anti-stick material to a surface of such sheet metal base member in a region inwardly of the outer peripheral portion thereof, applying and conforming a sheet of uncured rubber stock to such surface of such base member, molding and curing such composite article to bond such rubber sheet material to such peripheral edge portion of such base member, injecting a sponge rubber-forming material through an opening in such base member somewhat to spread apart such rubber sheet material from such base member in the region where such rubber sheet material has not been adhered to such base member and then heating such composite article to blow such injected material to form sponge rubber and thereby stretch under rubber sheet material and resiliently support and cushion the same.

References Cited in the file of this patent

UNITED STATES PATENTS

| | | |
|---|---|---|
| 1,089,482 | Laarmann | Mar. 10, 1914 |
| 1,525,869 | Lakeman | Feb. 10, 1925 |
| 1,565,582 | Moore | Dec. 15, 1925 |
| 1,628,979 | Hood | May 17, 1927 |
| 2,217,137 | Roth et al. | Oct. 8, 1940 |
| 2,314,046 | Kalter | Mar. 16, 1943 |
| 2,376,653 | Boyer | May 22, 1945 |
| 2,382,784 | Emery | Aug. 14, 1945 |
| 2,552,641 | Morrison | May 15, 1951 |
| 2,586,208 | Corallo | Feb. 19, 1952 |
| 2,629,698 | Sterling | Feb. 24, 1953 |
| 2,653,139 | Sterling | Sept. 22, 1953 |
| 2,686,747 | Wurtz et al. | Aug. 17, 1954 |